United States Patent
Kim et al.

(10) Patent No.: US 8,062,836 B2
(45) Date of Patent: Nov. 22, 2011

(54) METHOD FOR MANUFACTURING AN OPTICAL FILTER FOR A STEREOSCOPIC IMAGE DISPLAY DEVICE

(75) Inventors: Sin-Young Kim, Daejeon (KR); Moon-Soo Park, Daejeon (KR); Byoung-Kun Jeon, Daejeon (KR); Sang-Choll Han, Daejeon (KR); Bu Gon Shin, Daejeon (KR); Hyuk Yoon, Gyunggi-do (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/128,386

(22) PCT Filed: Feb. 2, 2010

(86) PCT No.: PCT/KR2010/000637
§ 371 (c)(1),
(2), (4) Date: May 9, 2011

(87) PCT Pub. No.: WO2010/090429
PCT Pub. Date: Aug. 12, 2010

(65) Prior Publication Data
US 2011/0217638 A1 Sep. 8, 2011

(30) Foreign Application Priority Data
Feb. 3, 2009 (KR) .................. 10-2009-0008615

(51) Int. Cl.
*G03F 7/20* (2006.01)

(52) U.S. Cl. ........................... 430/321; 430/396
(58) Field of Classification Search .............. None
See application file for complete search history.

(56) References Cited

U.S. PATENT DOCUMENTS 5,327,285 A 7/1994 Faris
6,169,591 B1 * 1/2001 Kwon et al. ............... 349/124
(Continued)

FOREIGN PATENT DOCUMENTS

JP 10-123523 A * 5/1998
(Continued)

OTHER PUBLICATIONS

Computer-generated translation of JP 10-123523 (May 1998).*

*Primary Examiner* — John A. McPherson
(74) *Attorney, Agent, or Firm* — McKenna Long & Aldridge LLP

(57) ABSTRACT

The present invention relates to a method for manufacturing an optical filter for a stereoscopic image display device, which forms an alignment layer having different orientating directions along a fine region via a one-time continuous photo orientation process. The method comprising: forming a polymer layer on a substrate; a photo-orienting step comprising positioning a patterned mask above the polymer layer, the patterned mask having alternating light transmission regions and light shield regions arranged in both horizontal and a vertical directions to selectively transmit different polarized light, positioning a polarizer above the patterned mask where the polarizer has two distinguishable regions that transmit different polarized light, and downwardly irradiating UV light onto the polymer layer from above the polarizer, thereby forming an alignment layer having different orientating directions in fine regions of the polymer layer; and forming a retardation layer on the orientation layer. The alignment layer in which the fine regions with different orientating directions are formed alternately and continuously is obtained via a one-time continuous photo-orientation process. Therefore, the photo-orientation process and the method for manufacturing the optical filter are simplified in comparison with the conventional art. As a result, the process yield and productivity in the manufacturing of an optical filter for a 3D image display device are improved.

8 Claims, 3 Drawing Sheets

U.S. PATENT DOCUMENTS 6,377,295 B1     4/2002    Woodgate et al.

FOREIGN PATENT DOCUMENTS

| | | |
|---|---|---|
| KR | 10-1999-0007433 A | 1/1999 |
| KR | 10-0289026 B1 | 5/2001 |
| KR | 10-2002-0059028 | 1/2002 |
| KR | 10-0491752 B1 | 5/2005 |
| KR | 10-2005-0107965 A | 11/2005 |
| WO | WO 2005/012990 A1 * | 2/2005 |
| WO | WO 2005/096041 A1 | 10/2005 |

* cited by examiner

METHOD FOR MANUFACTURING AN OPTICAL FILTER FOR A STEREOSCOPIC IMAGE DISPLAY DEVICE

This application is a National Stage Entry of International Application No. PCT/KR2010/000637, filed Feb. 2, 2010, and claims the benefit of Korean Application No. 10-2009-0008615, filed on Feb. 3, 2009, which is hereby incorporated by reference for all purposes as if fully set forth herein.

BACKGROUND OF THE INVENTION

1. Field of the Invention

The present invention relates to a method for manufacturing an optical filter for a stereoscopic image display device, and more particularly, to a method for manufacturing an optical filter for a stereoscopic image display device, which forms an alignment layer having different orientating directions along a fine region via single photo orientation process.

2. Description of the Related Art

Stereoscopic (three-dimensional, 3D) image display technology is technology that displays a 3D image as if the object actually exists in 3D space. 3D image display technology is expected to lead the next generation of display devices as a new concept in realistic image display technology improving on the level of planar visuals.

A 3D effect is realized via a procedure in which the left and right images of an object, perceived by the left and right eyes, are processed by the brain. That is, since a person's eyes are spaced apart by about 65 mm, they see images in two slightly different directions. At this time, a 3D effect is realized due to the optical phenomenon of binocular disparity.

In order to display a 3D image, a 3D image display device uses a method of displaying stereoscopic images (3D image), that are slightly different images seen by an observer's respective left and right eyes. Such stereoscopic images can be displayed by way of the use of an eyeglasses method and an eyeglasses-free method. The methods for viewing a 3D image without wearing glasses include a parallax barrier method and a lenticular lens method. The parallax barrier method implements binocular disparity through a light shield layer having a structure in which barriers are regularly attached to the front or rear surface of a display panel. The lenticular lens method implements binocular disparity by using a small and regular semicylindrical lens called a lenticular lens. The two methods are advantageous in that glasses are not required; however, they are disadvantageous in that the effective viewing angle in which to obtain a 3D effect is significantly narrow, allowing only a single person to view a 3D image, and it is difficult to convert a 2D image into a 3D image.

The methods of viewing a 3D image while wearing glasses can be roughly divided into a shutter glasses method and a polarized glasses method. According to the shutter glasses method, the left-eye image and the right-eye image as displayed on a screen are alternately transmitted to each eye by the shutter glasses. An observer is able to separately recognize the left-eye image and the right-eye images alternately displayed on the screen due to the shutter glasses, and a 3D effect is obtained as the observer processes the two different images within his or her brain. However, the 3D display device using the shutter glasses method is disadvantageous in that the use of the shutter glasses increase the price of the product and an observer is directly exposed to electromagnetic waves generated by the driving of the shutter glasses.

According to the polarized glasses method, a patterned polarizer is mounted on an image display device. An observer experiences a 3D effect as a left-eye image and a right-eye image, having different polarization characteristics, are transmitted through the polarized glasses. The polarized glasses method is disadvantageous in that an observer must wear the polarized glasses, but is advantageous in that limitations on the viewing angle are small and the manufacturing thereof is easy.

The 3D image display device using the polarized glasses method may further include an optical film (optical filter) on the front surface of a screen display unit of a display device. As disclosed in U.S. Pat. No. 5,327,285, an optical film used in a 3D display device using the polarized glasses method, an optical film in which the right-eye image display unit and the left-eye image display unit are alternately disposed parallel to each other, is manufactured by coating a photoresist on a polarizing film in which a tri acetyl cellulose (TAC) film and an iodized stretched poly vinyl alcohol (PVA) film are laminated, exposing a predetermined portion, and by treating the exposed portion with a potassium hydroxide solution so that the function of phase difference of the predetermined portion is removed. Meanwhile, Korean Patent Application No. 2000-87186 discloses a method for manufacturing a 3D image display device. According to this patent application, a transparent substrate is coated with a birefringent material, and the birefringent material is subsequently partially exposed to light through a mask, thereby obtaining an optical filter (optical film) having portions in which chiral characteristics are modulated and portions in which original chiral characteristics are maintained, both of which are alternately arranged.

However, the manufacturing method disclosed in U.S. Pat. No. 5,327,285 is problematic in that it entails a complicated manufacturing step due to chemical etching, has high manufacturing costs, and has low productivity. The polarizing filter manufacturing method disclosed in Korean Patent Application No. 2000-0087186 is problematic in that it is actually somewhat difficult to control the chiral characteristics of the retarding material by using the intensity of light, resulting in low yield and instability according to temperature.

Therefore, there is a need for a method in which an optical filter for a 3D image display device with excellent process efficiency and productivity can be manufactured.

SUMMARY OF THE INVENTION

An aspect of the present invention provides a method for manufacturing an optical filter for a stereoscopic image display device, which is capable of improving productivity and process efficiency by simplifying its manufacturing process.

An aspect of the present invention also provides a method for manufacturing an optical filter for a stereoscopic image display device, which forms an alignment layer that has different orientating directions according to a fine region, via a single continuous photo orientation process.

Accordingly, an aspect of the present invention provides a method for manufacturing an optical filter for a stereoscopic image display device, the method comprising forming a polymer layer on a substrate; a photo-orienting step comprising positioning a patterned mask above the polymer layer, the patterned mask having at least one light transmission region and at least one light shield region that alternate in both a horizontal direction and a vertical direction to selectively transmit differently polarized light, positioning a polarizer above the patterned mask where the polarizer has two distinguishable regions transmitting differently polarized light, and downwardly irradiating UV light onto the polymer layer from above the polarizer, thereby forming an alignment layer having different orientating directions according to a fine region of the polymer layer; and forming a retardation layer on the orientation layer.

BRIEF DESCRIPTION OF THE DRAWINGS

The above and other aspects, features and advantages of the present invention will be more clearly understood from the following detailed description viewed in conjunction with the accompanying drawings, in which.

DETAILED DESCRIPTION OF THE PREFERRED EMBODIMENT

Figure 1:
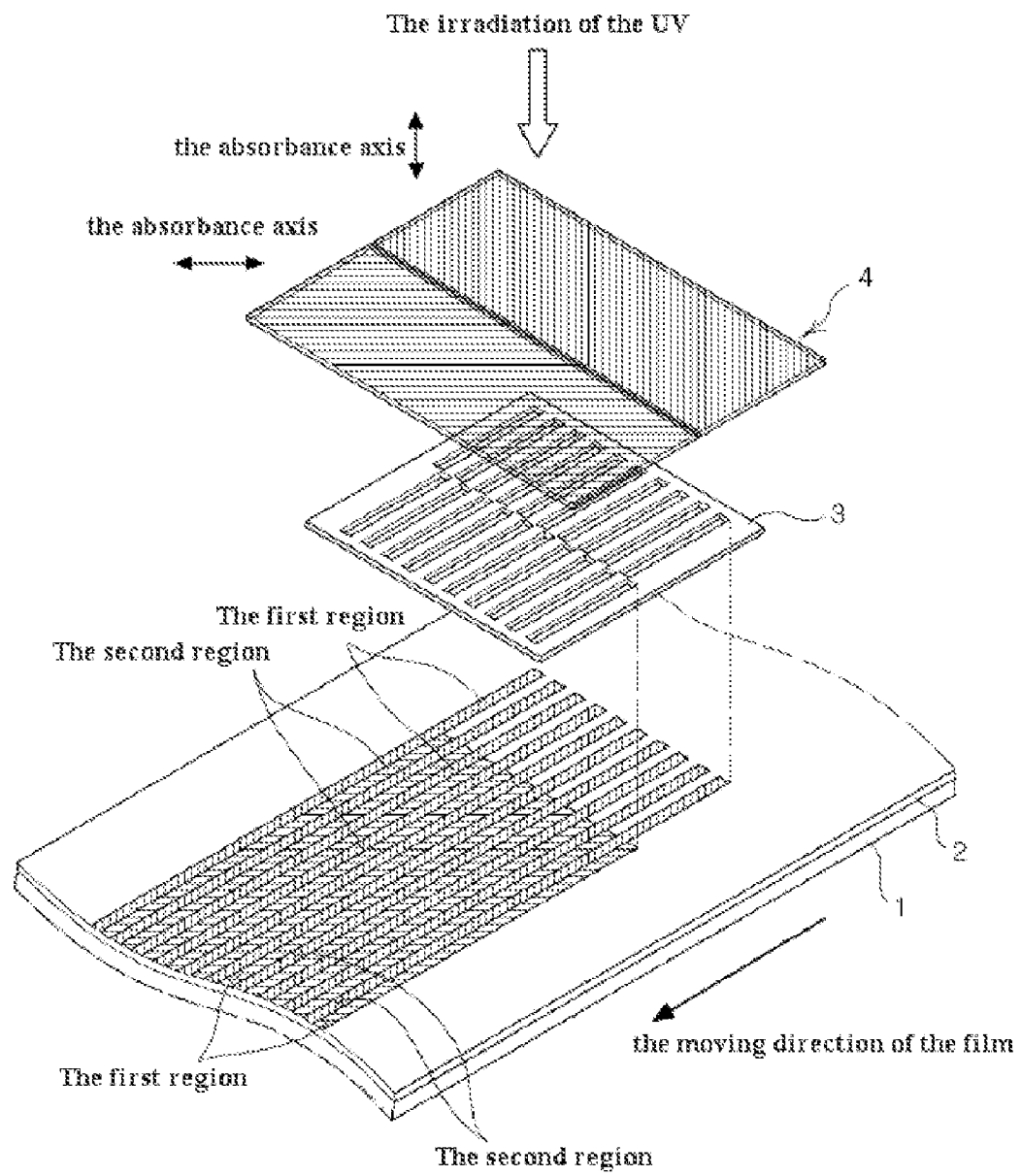
FIG. 1 shows a schematic of an illustrative embodiment of a photo-orientation step in a method for manufacturing an optical filter according to the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Reference numerals in the drawings denote like elements, and thus their description will be omitted.

An embodiment of the present invention provides a method for manufacturing an optical filter, which is used in a stereoscopic image display device using the polarizing glasses method, having a simpler process and greater process efficiency, as compared with the conventional art. Different orientations are assigned according to a fine region of a polymer layer via one-time continuous light irradiation.

In the method according to the embodiment of the present invention, a polymer layer is formed on a substrate, and differently polarized light is irradiated according to a region of the polymer layer via a one-time continuous photo orientation step. As a result of that, different orientations are formed according to a fine region of the polymer layer. Then, an optical filter is manufactured by forming a retardation layer (a liquid crystal layer) on the polymer layer (alignment layer) having different orientations according to the region. FIG. 1 illustrates a method for manufacturing an optical filter according to an embodiment of the present invention, specifically, a process for forming the polymer alignment layer having different orientating directions according to the fine regions of the polymer layer.

The substrate for the polymer alignment layer may include, but is not limited to, any substrate generally used in the art to which the invention pertains. For example, the substrate may include a triacetyl cellulose substrate, a poly(ethylene terephthalate) substrate, a poly(methyl methacrylate) substrate, a polycarbonate substrate, a polyethylene substrate, a cycloolefin polymer substrate such as a norbornene derivative, a poly(vinyl alcohol) substrate, a diacetylcellulose substrate or a glass substrate.

As illustrated in FIG. 1, a polymer layer 2 is formed on a substrate 1. The polymer layer 2 is a polymer resin whose orientation is assigned by light irradiation. The polymer layer 2 may be formed by any resin which is commonly used in the forming of a polymer alignment layer. The polymer layer may be made of at least one polymer resin selected from the group consisting of polyamide, polyimide, poly(vinyl alcohol), poly(amic acid), and poly cinnamate. However, the present invention is not limited thereto.

An alignment layer is obtained by irradiating polarized light onto the polymer layer 2 in order to assign orientations thereto. The optical filter for the stereoscopic image display device must have different orientations according to a predetermined region of the polymer layer in order to project images with different polarization characteristics. Therefore, the photo orientation step for forming the alignment layer with different orientations according to the region is performed by using a mask having a pattern through which differently polarized light can be selectively transmitted according to the region of the polymer layer. Specifically, the patterned mask has at least one light transmission region and at least one light shield region that alternate with each other both in a horizontal direction and in a vertical direction, so that different polarized light may be selectively transmitted. One or two or more sheets of the patterned mask may be used depending on the pattern formed on the mask.

Figure 2:
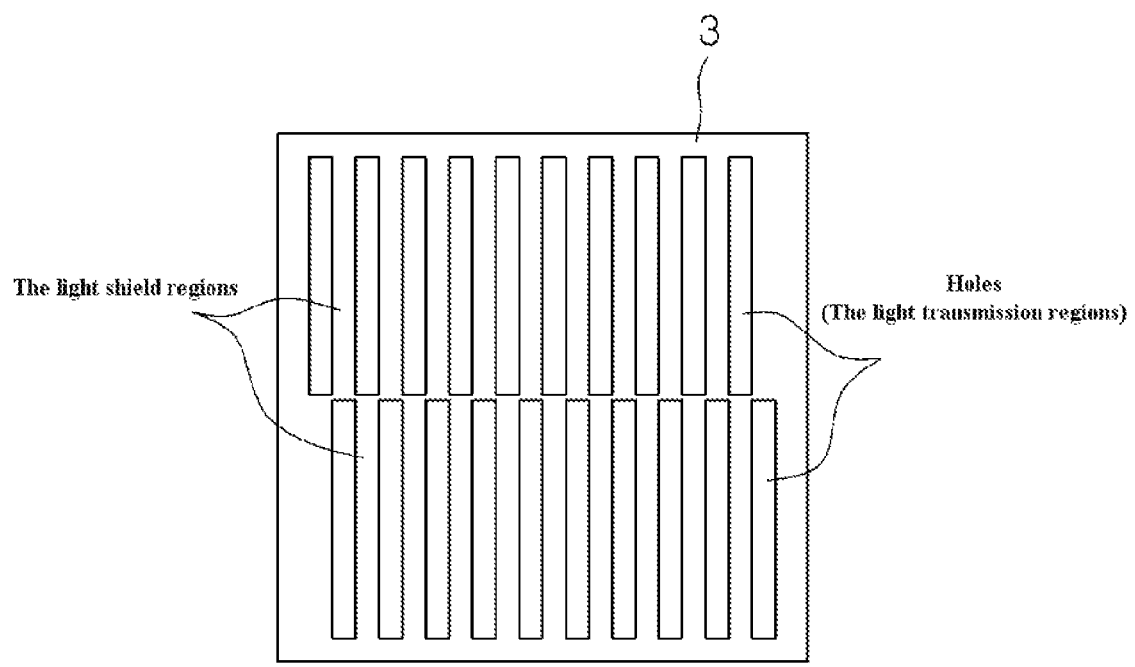
FIG. 2 shows a schematic of an illustrative embodiment of a patterned mask having a two-stage pattern which may be used in the photo-orientation step in the method for manufacturing the optical filter according to the present invention.

FIG. 2 shows a schematic of an illustrative embodiment of a patterned mask which may be used in the method according to the embodiment of the present invention.

The patterned mask of FIG. 2 includes a first stage pattern that comprises at least one light transmission region and at least one light shield region which alternate with each other in a horizontal direction; a second stage pattern that comprises at least one light transmission region and at least one light shield region which alternate with each other in a horizontal direction and are located below the light transmission region and the light shield region of the first stage pattern, such that the light shield region of the second stage pattern is positioned below the light transmission region of the first stage pattern and the light transmission region of the second stage pattern is positioned below the light shield region of the first stage pattern. In the case of the patterned mask illustrated in FIG. 2, one sheet of the patterned mask having alternating at least one light transmission region and at least one light shield region in both a horizontal direction and a vertical direction is used. Therefore, as illustrated in FIG. 1, the alignment layer having different orientating directions according to a fine region of the polymer layer can be formed. If necessary, two or more sheets of the patterned mask illustrated in FIG. 2 may be used.

Figure 3:
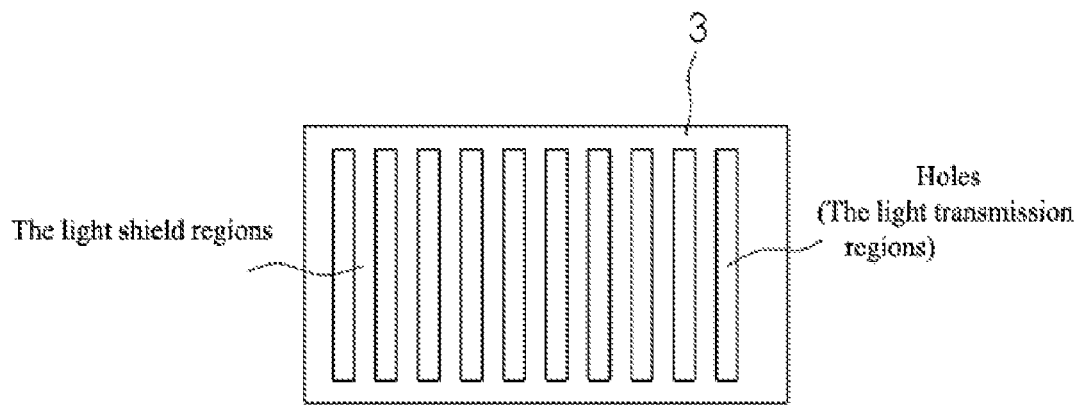
FIG. 3 shows a schematic of an illustrative embodiment of a patterned mask having a one-stage pattern which may be used in the photo-orientation process in the method for manufacturing the optical filter according to of the present invention.
Figure 4:
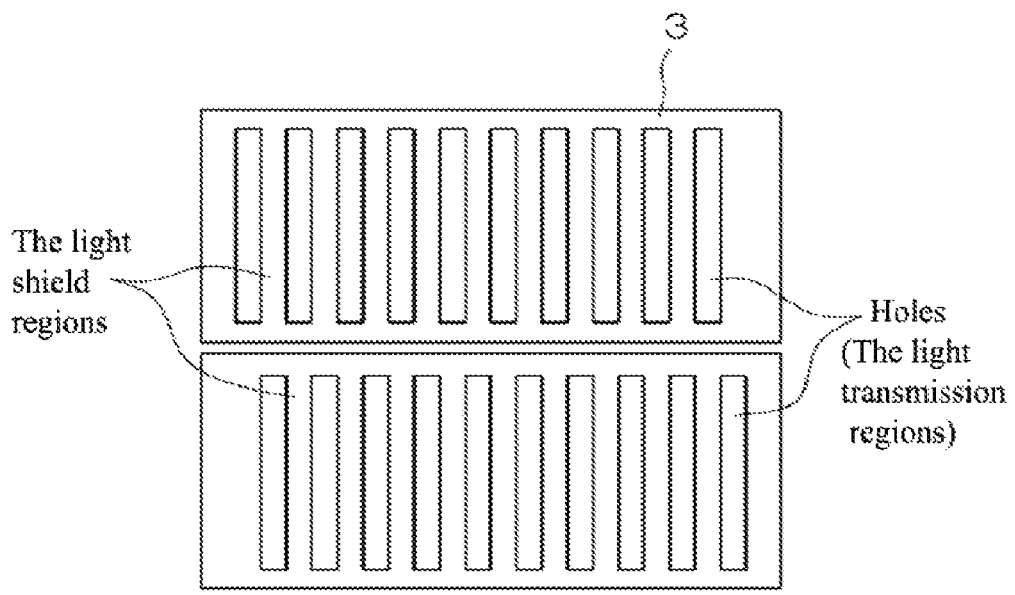
FIG. 4 shows a schematic of an illustrative embodiment of the use of two sheets of a patterned mask having the one-stage pattern of FIG. 3.

Furthermore, as illustrated in FIG. 3, two sheets of a patterned mask having alternating at least one light transmission region and at least one light shield region is used to provide the mask pattern as illustrated in FIG. 2. In this way, an alignment layer having different orientating directions according to a fine region of the polymer layer may be formed. FIG. 4 illustrates a state in which two sheets of the patterned mask illustrated in FIG. 3 are arranged. That is, as illustrated in FIG. 4, the patterned mask of FIG. 3 may be used in such a manner that the light transmission regions and the light shield regions alternate in a vertical direction. If necessary, three or more sheets of the patterned mask illustrated in FIG. 3 may be used.

Although not limited thereto, for example, as illustrated in FIG. 1, the patterned mask 3 having the pattern of FIG. 2 is positioned on the polymer layer 2, or two sheets of the patterned mask 3 having the pattern of FIG. 3 are positioned above the polymer layer 2 such that they may be positioned as in FIG. 4, and then a UV polarizer 4 having two regions, each of which transmit differently polarized light is positioned above the patterned mask 3 parallel to the moving direction of the film. Then, while moving the polymer layer along the moving direction of the film in FIG. 1, UV light is irradiated downward from above the UV polarizer 4 through the UV polarizer and the patterned mask 3 to the polymer layer 2. Thus, differently polarized UV light is selectively irradiated onto the first region and the second region of the polymer layer. Accordingly, an alignment layer, in which predetermined regions with different orientating directions are alternately formed, is obtained. More specifically, in the alignment layer illustrated in FIG. 1, the first region and the second region, in which polymer is aligned in different orientating directions, are alternately formed in a lengthwise direction.

Then a retardation layer is formed on the alignment layer. The phase retardation layer may be formed by coating and cross-linking photo-crosslinkable liquid crystal, more specifically, nematic liquid crystal. The nematic liquid crystal is a polymerizable and reactive liquid crystal polymer. The nematic liquid crystal is polymerized with an adjacent liquid crystal monomer by light so as to form a liquid crystal polymer. The nematic liquid crystal may include any kind of a nematic liquid crystal which is generally known as a material used to form a retardation layer in the arts to which the invention pertains. One or more kinds of materials having an acrylate group, which is polymerizable by photoreaction, may be used. Examples of the liquid crystal material having the acrylate group may include a low-molecular-weight liquid crystal exhibiting a nematic phase at room temperature or high temperature, such as cyano biphenyl acrylate, cyano phenyl cyclohexane acrylate, cyano phenyl ester acrylate, benzoic acid phenyl ester acrylate, phenyl pyrimidine acrylate, and a mixture thereof.

The photo-crosslinkable liquid crystal is coated onto the alignment layer as an isotropic material state and is then phase-transitioned to a liquid crystal by polymerization during drying and curing processes. Thus, the photo-crosslinkable liquid crystal may be aligned in a specific direction (absorbance axis direction of the UV polarization direction) and its orientating direction is fixed. That is, the optical axes of the nematic liquid crystal having the optical anisotropy are differently orientated according to a fine region on the alignment layer that has different orientating directions according to a fine region, and the polarization direction of light which has passed through the fine region is differently controlled. Furthermore, the orientation of the liquid crystal is not changed in subsequent processes, even though another layer is laminated on the retardation layer.

In forming the retardation layer, the coating thickness of the photo-crosslinkable liquid crystal may be adjusted so that the retardation layer has an appropriate phase retardation value. Meanwhile, the retardation layer may be formed to have a phase difference value of a ½ wavelength in order for conversion to a linearly polarized light, or have a retardation value of a ¼ wavelength in order for conversion to circularly polarized light.

In stereoscopic display device technology using the polarizing glasses method, an optical filter manufactured by the method according to the embodiment of the present invention may be used.

In the method for manufacturing the optical filter according to the embodiment of the present invention, except for forming the alignment layer in which the fine regions (specifically, the first region and the second region) with different orientating directions are alternately formed by using the specific mask and the polarizer having two regions, which transmit differently polarized light to each other, the substrate, the polymer layer, the kind of liquid crystal, the materials used to form the polymer layer and the retardation layer, the forming method thereof, and the thickness of the polymer layer as well as the retardation layer are common in the art to which the invention pertains and may be selectively applied in order to exhibit desired optical characteristics, but the present invention is not limited thereto.

Hereinafter, the embodiment of the present invention will be described. The following embodiment is an exemplary implementation example which will help with understanding the present invention, but the present invention is not limited thereto.

As illustrated in FIG. 1, a polymer layer 2 of polycinnamate having a dry thickness of 1,000 Å was formed on a triacetyl cellulose substrate 1 having a thickness of 80 μm.

The polymer layer 2 of polycinnamate was formed by coating a solution for forming the polymer layer on the triacetyl cellulose substrate 1, that has a thickness of 80 μm, such that the coating layer had a thickness of 1,000 Å after being dried by using a roll coating method, and removing solvent from the inside of the coating layer by heating at 80° C. for 2 minutes in an oven. At this time, as the solution for forming the polymer layer, solution that was prepared by mixing a mixture of polynorbornene (weight average molecular weight ($M_w$)=150,000) having a cinnamate group, which is represented by a chemical formula I below and acrylate monomers with photoinitiator (Igacure 907) and dissolving the resulting mixture in a cyclohexanone solvent so that the solid content of the polynorbornene became 2 weight % was used. Also, the weight ratio of polynorbornene:acrylate monomer:photoinitiator was 2:1:0.25. As the solvent, cyclopentanone may also be used instead of the cyclohexanone.

Chemical Formula 1

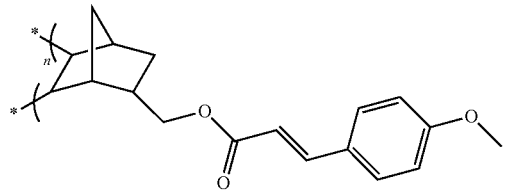

Then, the patterned mask 3 (100 mm×100 mm) which had a pattern as in FIG. 2, and in which the light transmission regions had a width of 500 μm and light transmission regions and light shield regions alternated with each other in both a horizontal direction and a vertical direction was placed on the polymer layer 2 of polycinnamate.

In the patterned mask 3, the width of the light transmission region should be matched with the pixel interval in the display device in which the manufactured optical filter is to be used. For example, the width of the light transmission region may be an interval of about 300 μm for a monitor, and may be an interval of about 450 μm for a TV, but it is not limited thereto. In the mask pattern, there is no special limitation on the length of the light transmission region. Those skilled in the art can suitably adjust the length of the light transmission region in consideration of the amount of light necessary for orientation and convenience in photo-orientation.

Then, as illustrated in FIG. 1, a UV polarizer 4 having two regions, each of which transmit different polarized light was positioned over the patterned mask 3 parallel to the moving direction of the film. Thereafter, UV light having an intensity of 300 mW/cm² was continuously irradiated downwards from above the UV polarizer 4 for 30 seconds, while substrate was moved at a speed of 3 m/min in the moving direction of the film of FIG. 1, thereby obtaining the alignment layer in which at least one first orientation region and at least one second orientation region having polymers aligned in different directions along a predetermined region of the polymer layer 2 of polycinnamate are alternately formed along a lengthwise direction of the polymer layer.

As the liquid crystal material, LC242™, commercially available from the BASF Company, was coated to have a dry thickness of about 1 μm, and the liquid crystal was cured by irradiating UV light having an intensity of 300 mW/cm² upon it for 10 seconds, thereby forming a retardation layer. As the liquid crystal material, Reactive Mesogen (RM) based materials may also be used. Since the retardation layer was formed on the alignment layer in which polymers were aligned in different orientating directions in the fine regions, the optical axes of the optical anisotropic material are differently aligned in the fine regions. As a result, an optical filter for a 3D image display device was obtained.

When light passes through the optical filter according to the embodiment of the present invention, in which the optical axes of the liquid crystal are differently aligned and fixed in the fine regions, the light polarization direction is differently controlled, depending on the transmission regions of the optical filter. Therefore, since the left-eye image and the right-eye image with different polarization characteristics as emitted through the polarization filter, are projected through the polarized glasses, the observer recognizes a 3D effect via the polarized glasses method.

In the method for manufacturing the optical filter for the 3D image display device, the patterned mask in which the light transmission region and the light shield region alternately intersect vertically and horizontally and the polarizer having two distinguishable regions transmitting different polarized light are used in order that different polarized light is selectively transmitted. Therefore, the fine regions of the polymer layer are alternately arranged in different orientating directions by the continuous photo-orientation process via one-time continuous light irradiation.

Therefore, an alignment layer in which the fine regions with different orientating directions are formed alternately and continuously is obtained. Since such an alignment layer is formed by a one-time continuous photo-orientation process, the photo-orientation process and the method for manufacturing the optical filter are simplified in comparison with the conventional art. As a result, the process yield and productivity in the manufacturing of the optical filter for the 3D image display device are improved.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for manufacturing an optical filter for a stereoscopic image display device, the method comprising:
    forming a polymer layer on a substrate;
    photo-orientation comprising positioning a patterned mask above the polymer layer, positioning a polarizer above the patterned mask, and irradiating ultraviolet light onto the polymer layer from the upper side of the polarizer, thereby forming an alignment layer having different orientation directions in fine regions of the polymer layer; and
    forming a retardation layer on the alignment layer,
    wherein a first stage pattern having at least one light transmission region and at least one light shield region which alternate in a horizontal direction, and a second stage pattern having at least one light transmission region and at least one light shield region which alternate in a horizontal direction are perpendicularly formed in the patterned mask,
    wherein the light transmission region and the light shield region of the first stage pattern and the light transmission region and the light shield region of the second stage pattern alternate with each other in a vertical direction so that the light shield region of the second stage pattern is positioned below the light transmission region of the first stage pattern and the light transmission region of the second stage pattern is positioned below the light shield region of the first stage pattern,
    wherein the polarizer has two distinguishable regions, each of which transmit differently polarized light to each other,
    wherein the patterned mask and the polarizer are positioned during the irradiation of the ultraviolet light on the polymer layer, such that the polarized light which passes through one region of the polarizer passes only through the light transmission region of the first stage pattern and is then irradiated onto the polymer layer, and the polarized light which passes through the other region of the polarizer passes only through the light transmission region of the second stage pattern and is then irradiated onto the polymer layer.

2. The method of claim 1, wherein the patterned mask is one sheet of the patterned mask that comprises:
    the first stage pattern having alternating at least one light transmission region and at least one light shield region in a horizontal direction;
    the second stage pattern having alternating at least one light transmission region and at least one light shield region in a horizontal direction,
    wherein the light transmission region and the light shield region of the first stage pattern and the light transmission region and the light shield region of the second stage pattern alternate with each other in a vertical direction so that the light shield region of the second stage pattern is positioned below the light transmission region of the first stage pattern and the light transmission region of the second stage pattern is positioned below the light shield region of the first stage pattern.

3. The method of claim 1, wherein two sheets of the patterned mask, each of which has a first stage pattern having alternating at least one light transmission region and at least one light shield region in a horizontal direction are used as the patterned mask by positioning them such that the light transmission region and light shield region of the first patterned mask and the second patterned mask alternate with each other in a vertical direction.

4. The method of claim 1, wherein the polymer layer comprises at least one selected from the group consisting of polyamide, polyimide, poly(vinyl alcohol), poly(amic acid), and polycinnamate.

5. The method of claim 1, wherein the retardation layer is formed of nematic liquid crystal.

6. The method of claim 1, wherein the retardation layer is formed to have a retardation value of ½ wavelength or ¼ wavelength.

7. The method of claim 1, wherein the substrate is triacetyl cellulose, poly(ethylene terephthalate), poly(methylmethacrylate), polycarbonate, polyethylene, cycloolefin polymer, poly(vinyl alcohol) or diacetyl cellulose substrate.

8. The method of claim 1, wherein photo-orienting is performed by moving the substrate.

* * * * *